(12) United States Patent
Madsen (10) Patent No.: US 7,206,477 B2
(45) Date of Patent: Apr. 17, 2007

(54) OPTICAL ALL PASS FILTER DEVICE HAVING IMPROVED TIME-BANDWIDTH BEHAVIOR

(75) Inventor: Christi Kay Madsen, South Plainfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/442,443

(22) Filed: May 21, 2003

(65) Prior Publication Data

US 2004/0234192 A1 Nov. 25, 2004

(51) Int. Cl.
G02B 6/28 (2006.01)
G02B 6/00 (2006.01)

(52) U.S. Cl. .......................................... 385/24; 385/27
(58) Field of Classification Search .................. 385/15, 385/18, 24, 31, 39, 47
See application file for complete search history.

(56) References Cited

U.S. PATENT DOCUMENTS

| | | | | |
|---|---|---|---|---|
| 6,137,604 | A * | 10/2000 | Bergano | 398/1 |
| 6,556,742 | B2 * | 4/2003 | Shirasaki | 385/24 |
| 6,567,577 | B2 * | 5/2003 | Abbott et al. | 385/24 |
| 6,674,937 | B1 * | 1/2004 | Blair et al. | 385/24 |
| 2004/0208649 | A1 * | 10/2004 | Matthews et al. | 398/195 |

OTHER PUBLICATIONS

Leick et al, Dispersion Compensation of 1XN Passive Optical Router With Loww Loss, A Flat Passband, and Low Cross Talk, Aug. 1, 2002, Optics Letters, vol. 27, No. 15, pp. 1318-1320.*

Lenz et al: "Optical Delay Lines Based on Optical Filters," IEEE, J of Quantum Electronics, vol. 37, No. 4, pp. 525-532,2001.
Sakamoto et al.: "Variable Optical Delay Circuit Using Wavelength Converters," Electronics Lett., vol. 37, No. 7, Mar. 29, pp. 454-455, 2001.
Froggatt: "Full Complex Transmission and Reflection Characterization of a Bragg Grating in a Single Laser Sweep," Optical Fiber Communication Conference, vol. 2, p. 22-24, WBI, 2000.
Nelson et al: "Optical Monitoring Using Data Correlation for WDM Systems," IEEE, Photon Technol. Lett., vol. 10, No. 7, pp. 1030-1032, 1998.
Madsen: "Optical All-Pass Filters for Phase Response Design With Applications for Dispersion Compensation," IEEE Photonics Technol. Lett., vol. 10, No. 7, pp. 994-996, 1998.

(Continued)

Primary Examiner—Sung Pak

(57) ABSTRACT

A new filter architecture uses subband division and a reflector structure. A de-multiplexer/multiplexer combination creates N subband branches comprising dispersive elements, phase control elements, and/or delay elements. The new structure yields high spectral accuracy across the filter's overall free spectral range (FSR). In one embodiment of the inventive filter, the overall filter has a free spectral range (FSR) of F, and the first multiband filter (MBF) has a FSR of $$F_{fmbf} = \frac{F}{N}.$$

The N subband outputs of the first multiband filter create a plurality of branches. Each branch comprises a dispersive element and optionally one or more elements such as a phase control element and/or a delay element. A reflector at the end of each of these branches reflects the light back through the branches and each of the MBFs and the first MBF.

20 Claims, 3 Drawing Sheets

OTHER PUBLICATIONS

Paiam: "Design of Phased-Array Wavelength Division Multiplexers Using Multimode Interference Couplers," Appl. Opt., vol. 36, No. 21, pp. 5097-5108, 1997.

Madsen: "A Multiport Band Selector With Inherently Low Loss, Flat Passbands and Low Crosstalk," IEEEPhoton. Technol. Lett., vol. 10, No. 12, pp. 1766-1768, 1998.

Jinguji et al.: "Optical Half-Band Filters," J.Lightw. Technol., vol. 18, No. 2, pp. 252-259, 2000.

Xie et al.: "Tunable Compensation of the Dispersion Slope Mismatch in Dispension-Managed Systems Using a Sampled Nonlinearly-Chirped fbg," IEEE Photon. Technol. Lett., vol. 12, No. 10 pp. 1417-1419, 2000.

* cited by examiner

OPTICAL ALL PASS FILTER DEVICE HAVING IMPROVED TIME-BANDWIDTH BEHAVIOR

FIELD OF THE INVENTION

This invention relates to optical filters, and in particular to optical filters useful for dispersion compensation, delay lines, and dispersion slope compensation.

BACKGROUND OF THE INVENTION

Optical communication systems transmit light signals over distances ranging from less than a few meters to over hundreds of kilometers. As the light signals propagate in optical waveguides they become distorted in various ways because the waveguides are not an ideal transmission media.

Dispersion is one of the most prevalent forms of distortion in optical transmission systems. Dispersion causes the transmitted optical waveforms to undesirably change shape as the various wavelength components that make up the signals propagate at slightly different speeds through the waveguide.

Optical components can be used to correct various types of signal distortion caused by transmission through waveguides. Some of the most commonly used devices are dispersion compensators and dispersion slope compensators.

Tunable dispersion compensators can be tuned to effect correction at specific wavelengths. Tunable dispersion compensators have been realized using optical allpass filters implemented with ring resonators in planar waveguides and Gires-Tournois cavities using thermal and micro-mechanical tuning. Variable optical delay lines and dispersion slope compensators can also be realized with the same filter structures. Other applications for variable delays include polarization mode dispersion compensation, optical buffering and other optical signal processing.

For allpass filters, there is an inherent tradeoff between dispersion and filter bandwidth. That is, dispersion is increased in a single allpass filter stage only at the cost of a concomitant decrease in bandwidth. However, by increasing the number of stages, the dispersion can be increased for a given bandwidth. The stages are optically coupled, or cascaded in series.

Cascading creates many tradeoffs, including the ability to make tradeoffs between dispersion, bandwidth, and approximation error (or accuracy). Cascading, however, tends to produce undesirable features in the filter spectral response, including amplitude ripple over the desired filter bandwidth caused by lossy filters.

What is needed is a new optical filter architecture that exhibits better tradeoffs between the phase and amplitude characteristics and ease of fabrication than cascaded filters over a desired filter bandwidth.

SUMMARY OF THE INVENTION

A new filter architecture uses subband division and a reflector structure. A de-multiplexer/multiplexer combination creates N subband branches comprising dispersive elements, phase control elements, and/or delay elements. A reflector receives the light from each branch and reflects it back through the respective branch to the filter output. The new structure yields high spectral accuracy across the filter's overall free spectral range (FSR).

In one embodiment of the inventive filter, the overall filter has a free spectral range (FSR) of F, and the first multiband filter (MBF) has a FSR of $$F_{fmbf} = \frac{F}{N}.$$

The N subband outputs of the first multiband filter create a plurality of branches. Each branch comprises a dispersive element and optionally one or more elements such as a phase control element and/or a delay element. At each branch end is another MBF having N outputs. The N outputs form further branches comprising one or more elements such as a dispersion element, phase control element and/or a delay element. A reflector at the end of each of these branches reflects the light back through the branches and each of the MBFs and the first MBF. Advantageously, light enters the filter arrangement through one port of an optical circulator, and after reflection, the returning light again passes through the circulator and exits through a second port distinct from the entry port.

DRAWINGS

The advantages, nature and various additional features of the invention will appear more fully upon consideration of the illustrative embodiments now to be described in detail in connection with the accompanying drawings. In the drawings.

It is to be understood that the drawings are for the purpose of illustrating the concepts of the invention, and except for the graphs, are not to scale.

DETAILED DESCRIPTION

Figure 1:
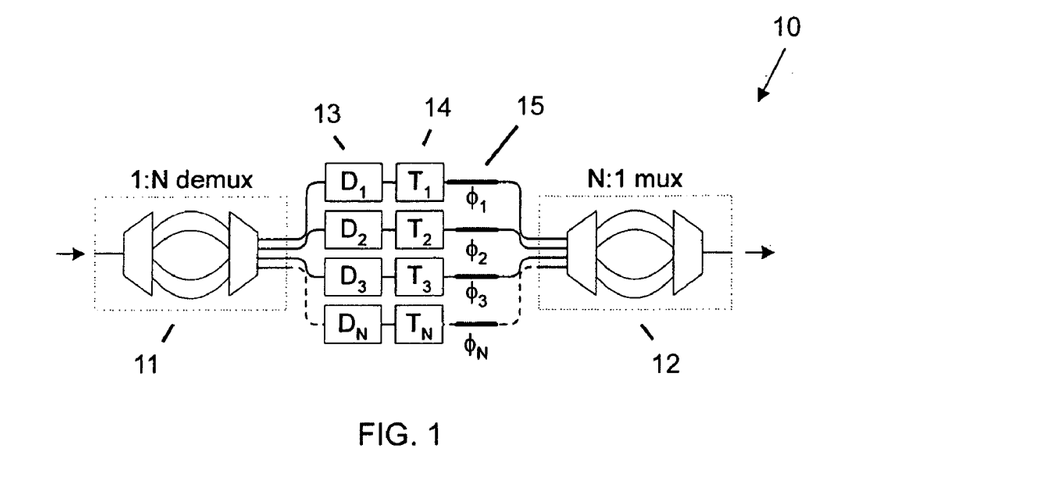
FIG. 1 shows a block diagram of a transmissive filter architecture.
Figure 2:
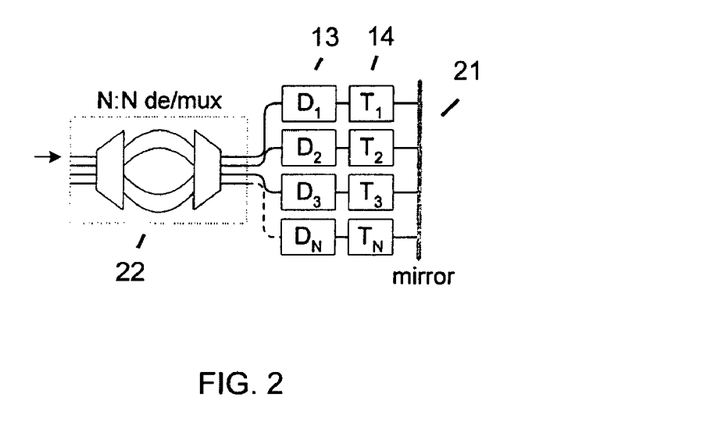
FIG. 2 shows a block diagram of a reflective filter architecture.
Figure 3:
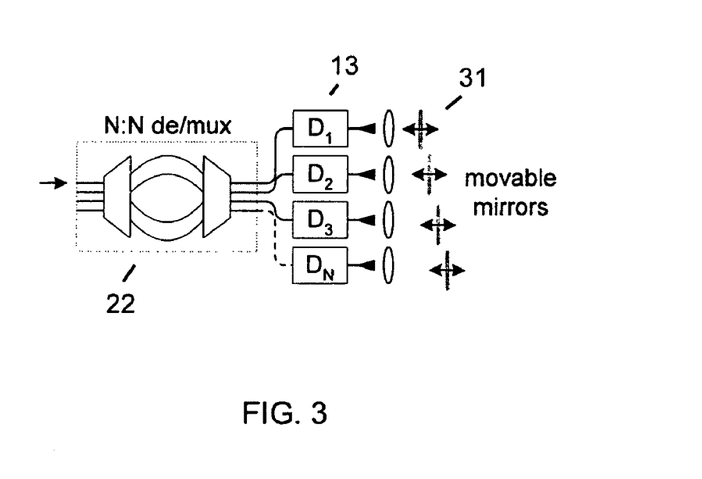
FIG. 3 shows a block diagram of a reflective filter employing movable mirrors.

The filter architecture 10 is explained using the transmissive design shown in FIG. 1 for application as a dispersion compensator. A 1×N subband demultiplexer 11 with a free spectral range (FSR) larger than the signal bandwidth, and preferably equal to the channel spacing in a WDM system, is employed to separate the FSR into N subbands. A matching N×1 subband multiplexer 12 recombines the signal at the filter output. A dispersive filter 13, the appropriate offset delay 14, and a relative phase control 15 for a particular dispersion value is placed in each connecting port. All ports may be connected, or only the central ports relative to the channel center frequency. FIG. 1 shows a transmissive filter architecture, while FIGS. 2 and 3 show reflective filter architectures. The figures show dispersive elements (Dn) 13, delay lines (Tn) 14, and phase controls (φn) 15. In FIG. 2, reflection is accomplished by mirror 21, in the embodiment of FIG. 3, reflection is accomplished by movable mirrors 31. The phase control elements are present, but not shown explicitly in FIGS. 2 and 3, the reflective designs. The dispersive elements (Dn) 13 are identical, except shifted with respect to frequency. The delays (Tn) 14 are determined by the difference in frequency between adjacent channels of the demultiplexer (Δf) multiplied by the dispersion (D). The FSR of the dispersive filter 13 can be chosen smaller than the FSR of the subband multiplexer 12 demultiplexer 11 pair; thus, larger bend radii and smaller core-to-cladding index contrasts may be employed for ring resonator implementations, which is advantageous from a fabrication viewpoint.

For the reflective design, a double pass through the delays and dispersive elements is obtained, thus making the needed dispersion 13 and delay 14 tuning ranges smaller by a factor of two compared to the transmissive design 10. By flipping the polarization state upon reflection, for example by including a quarter-waveplate oriented with its fast axis at 45 degrees relative to the waveguide's fast axis before the mirror, a polarization independent device is obtained. A circulator can separate the input and output. The reflective design also has the advantage of an already matched multiplexer/demultiplexer (mux/demux) pair 22.

Subband Filter Design Considerations—Preferred Embodiment

The ideal demultiplexer would have a dispersionless, box like response and split the FSR into N subbands with no crosstalk between subbands. In this section, practical subband filter requirements and implementations are considered. A general Mach-Zehnder interferometer (MZI) is depicted for the mux/demux 22 in FIG. 2, comprising a 1×N and N×N splitter interconnected by delay lines that differ in length by a unit delay T between adjacent paths. It is a finite impulse response (FIR) filter of order N−1. Note that the back-to-back mux/demux 22 by itself is an allpass filter with a frequency-independent delay. It can be viewed as performing a Fourier and inverse Fourier transform operation. Multiplexers for small N, say N<10, can be implemented in a variety of ways and with small excess losses. For the 1×N-splitter function, multi-mode interference (MMI) couplers with uniform and weighted splitting ratios are explored. Other options exist such as trees of 1×2 directional or MMI couplers as well as star couplers.

Figure 4:
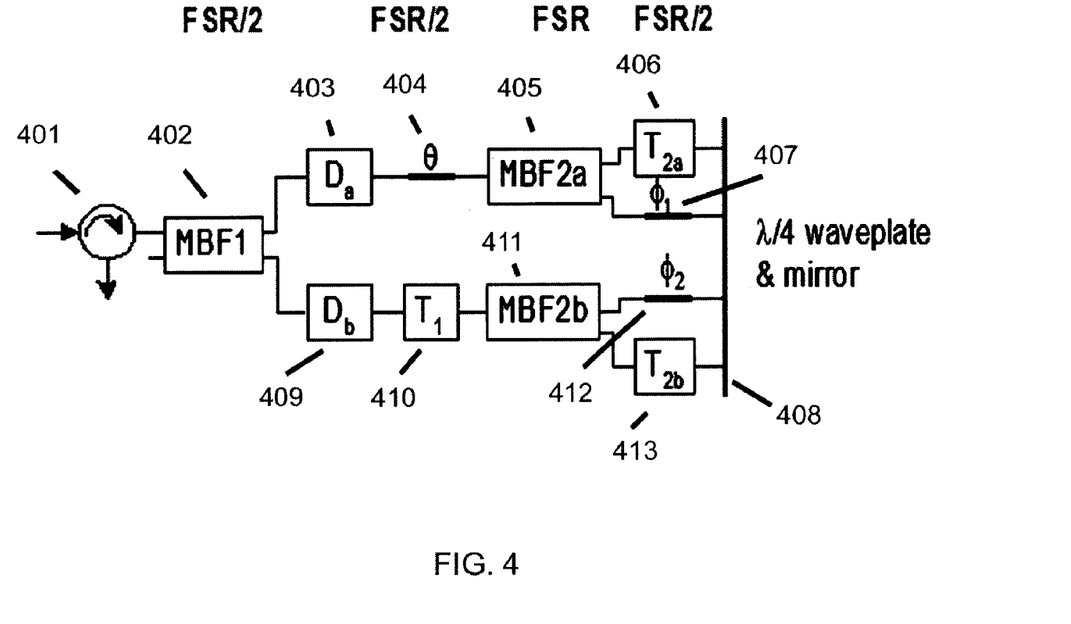
FIG. 4 shows a preferred embodiment of the reflective design employing two multi-band filter (MBF) stages.

A preferred embodiment for the filter architecture is the reflective design shown in FIG. 4, with a tree structure of cascaded 2×2 filters. The tree structure functions as a mux/demux pair. Light is input to circulator 401. Circulator 401 is optically coupled (coupled) to first output of multiband filter one (MBF1) 402. MBF1 402 is coupled to dispersive element Da 403, phase shifter θ 404, and multiband filter MBF2a 405. The two outputs of MBF2a 405 are coupled to delay $T_{2a}$ 406 and phase control $\phi_1$ 407. Both delay $T_{2a}$ 406 and phase control $\phi_1$ 407 outputs are coupled to a λ/4 waveplate and mirror 408. The second output of filter MBF1 402 is coupled to dispersive element Db 409 that is then coupled to delay $T_1$. Delay $T_1$ 410 is coupled to multi-band filter HGF2b 411. The first output of MBF2b 411 is coupled to phase control $\phi_2$ 412, and the second MBF2b output is coupled to delay $T_{2b}$. Both $T_{2b}$ 413 and the output of phase control $\phi_2$ 412 are also coupled to λ/4 waveplate and mirror 403.

Figure 5:
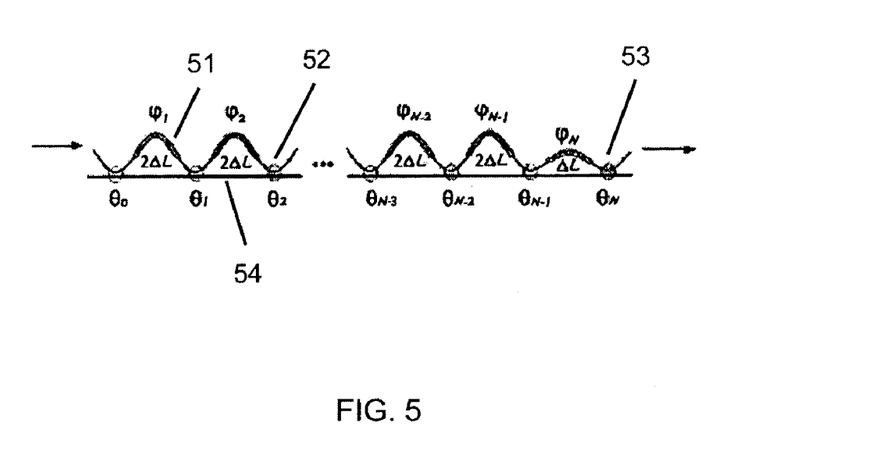
FIG. 5 shows a useable multi-band filter (MBF) lattice N-stage architecture.

The first multi-band filter has a free spectral range (FSR) equal to half that of the overall filter. Good filter rolloff around the 3 dB-points can be achieved to separate the even and odd sub-bands. The magnitude and delay for a $7^{th}$-order Chebyshev response, for example can be implemented as described in "*Optical Halfband Filters*", K. Jinguji and M. Oguma, Journal of Lightwave Technology, vol. 18, no. 2, pp. 252–259, 2000, and shown in FIG. 5. This filter comprises directional couplers $\theta_0$ to $\theta_N$ 52, phase-shifters $\phi_1$ to $\phi_N$ 51, and 3 dB coupler 53.

Tunable Dispersion and Delay

By staggering identical dispersive elements in frequency and adding an appropriate offset delay Δτ, a constant dispersion response is created across the whole filter response. The frequency offset for each dispersive element is chosen to align to the demultiplexer passband for the corresponding output port. The normalized frequency refers to the overall filter response, and the unit delay is T=1/FSR. The filter dispersion is $D=-cT^2 D_n/\lambda^2$ where $D_n=d\tau_n/df_n$ is the normalized dispersion defined as the derivative of the normalized delay with respect to the normalized frequency. For an FSR=100 GHz, the parameters are: T=10 ps and D=12.5 ps/nm for λ=1550 nm and $D_n$=1. For the same normalized dispersion, the dispersion D increases quadratically with the unit delay. For example, a 4-stage allpass filter with a period of 0.625×FSR, and a 1×5 mux/demux, designed according to FIGS. 1, 2, or 3, can have a bandwidth utilization (BWU) of 0.8 and a normalized dispersion of 6.25. Without compensating for the subband filter's dispersion, the resulting group delay ripple across the passband was found to be +/−0.2 $T_{apf}$, where $T_{apf}$ is the allpass filter unit delay. Since the overall filter FSR is not an integer multiple of the allpass filter FSR in this case, the response over adjacent periods is not the same. For the architecture of FIG. 4, the allpass filter FSR can be chosen to be equal to half the overall filter FSR and the BWU design requirements can be relaxed from 0.8 to 0.5. The BWU is defined as the passband width over which the dispersion is approximately constant relative to the FSR. For a given dispersion and allowable group delay ripple, smaller BWUs require fewer stages.

EXAMPLE

Dispersion Compensator Design

For the architecture of FIG. 4, using $7^{th}$-order Chebyshev response for both multi-band filter stages, the dispersive element design is substantially relaxed. A 4-stage filter with FSR=50 GHz and BWU=0.60 can provide over 1000 ps/nm dispersion with small group delay ripple. In this case, passbands of 90 to 95 GHz can be achieved for a 100 GHz FSR. Note that lossless filters and perfect cancellation of any subband filter dispersion are assumed in these simulations. As, for example, by tailoring the allpass filter response to compensate any dispersion from the MBFs. In practice, feedback path losses of 0.1 dB/roundtrip should be achievable. While roundtrip loss will change the magnitude response, it will not significantly impact the delay response. For the dispersion compensator to be continuously tunable, the relative phases between each path in FIG. 4 can vary continuously. A reflective architecture identical is suitable. For a large dispersion tuning range, multiple 2π radians of phase change will be needed.

A Continuously Variable Delay Line

Figure 6:
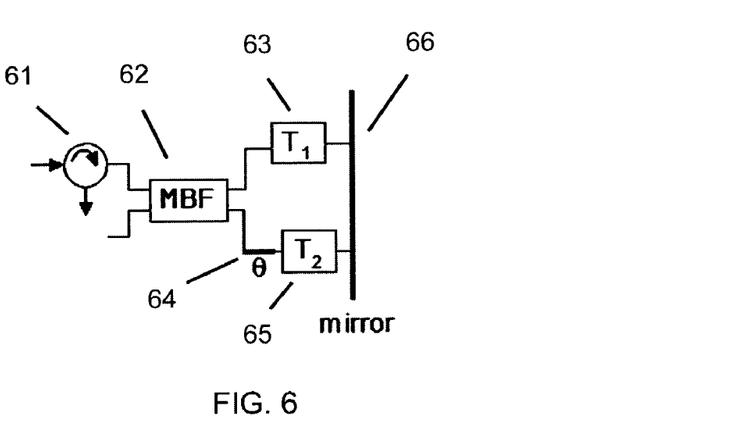
FIG. 6 shows a variable delay line architecture.

To implement a variable delay line, the simplified architecture shown in FIG. 6 is used. Circulator 601 is coupled to multi-band filter (MBF) 602. The first output of MBF 602 is coupled to delay T1 603. The second output of MBF 602 is coupled to phase shifter 604 and delay T2 605. The outputs of delay T1 603 and T2 605 are coupled to mirror 606 reflecting the signals back through both delays for a second pass. Delay T1 603 and T2 605 are tuneable multi-stage allpass filters providing variable, frequency-independent delay over half the allpass filter FSR. With a 10-stage allpass filter, a tuning range of 12.5 unit delays times two, assuming double-pass operation, can be achieved with negligible delay ripple. For allpass filters with an FSR=50 GHz, this corresponds to a tuning range of 500 ps. Further reduction of the filter FSRs to 25 GHz can provide a 1000 ps range, which is 40 bits at 40 Gb/s or 30 centimeters in free space. For delays which are a multiple of the unit delay, the phase difference between subbands at the transition frequencies are identical and can be compensated by the phase shifter θ 604 to achieve a remarkable 100% bandwidth utilization.

At intermediate delays, phase shifter 604 can be set to match the sub-band phases at one transition frequency, and over 90% of bandwidth utilization can be obtained. A tradeoff can be made between the loss and delay ripple around the subband transition frequencies. For example, the allpass filter delay response can be designed to meet the continuous phase requirement and provide negligible loss ripple while allowing a larger delay ripple through the transition region.

A Dispersion Slope Compensator

In WDM systems, fiber dispersion is desirable to reduce four-wave mixing; however, it is periodically compensated by fixed lengths of dispersion compensating fiber. Since the dispersion of both the transmission and compensating fiber are wavelength dependent, the cumulative dispersion for all channels is not perfectly compensated and a device to compensate the residual dispersion can be advantageously used. The inventive architecture can be applied to dispersion slope compensation by choosing a filter FSR slightly different than the channel separation and synthesizing a quadratic delay response. Thus, adjacent channels experience a different dispersion. The architecture can provide scalability in bandwidth, dispersion range, and number of channels compensated in a planar waveguide implementation, as well as tunability of the compensating function.

Let the desired filter delay be described by $$\tau_S(\Delta\lambda) = \tau_0 - \frac{s}{2}(\Delta\lambda)^2$$

where s is the dispersion slope in ps/nm² and Δλ is the wavelength offset in nanometers from the channel center frequency. The local dispersion across the filter period is then $D_f(\Delta\lambda)=s\Delta\lambda$.

Figure 7:
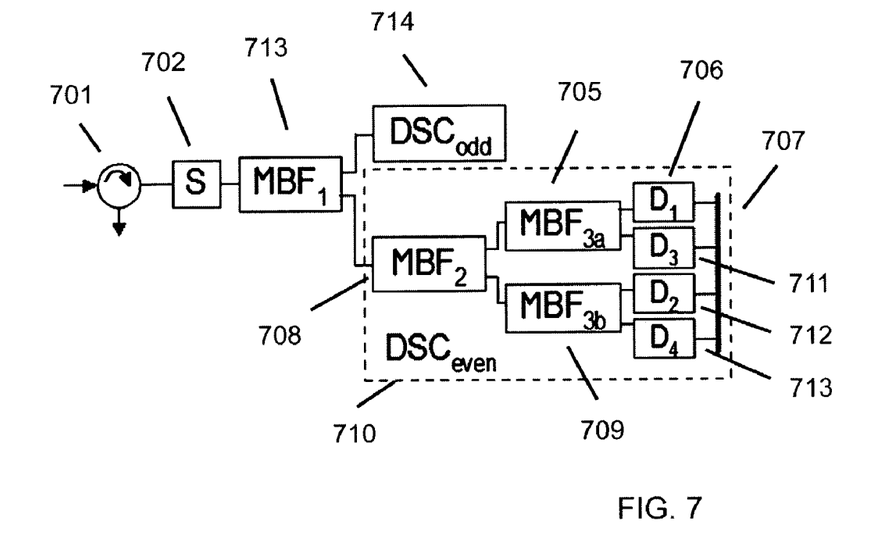
FIG. 7 shows a dispersion slope compensation (DSC) architecture.

FIG. 7 shows a dispersion slope compensation architecture using the inventive filter. Circulator 701 is coupled to allpass filter 702. Allpass filter 702 is coupled to multi-band filter (MBF1) 703. The first output of MBF1 703 is coupled to a dispersion slope compensator (DSC$_{odd}$) 704 (not further shown in its component parts). The second output of multi-band filter (MBF1) 703 is coupled to a dispersion slope compensator (DSC$_{even}$) 710 that is shown in its component parts. DSC$_{even}$ 710 comprises multi-band filter MBF$_2$ 708 as its input stage. The first output of multi-band filter MBF$_2$ 708 is coupled to MBF$_{3a}$ 705. The first output of MBF$_{3a}$ 705 is coupled to dispersion element D$_1$ 706. The second output of MBF$_{3a}$ 705 is coupled to dispersion element D$_3$ 711. The second output of multi-band filter MBF$_2$ 708 is coupled to MBF$_{3b}$ 709. The first output of MBF$_{3b}$ 709 is coupled to dispersion element D$_2$ 712. The second output of MBF$_{3b}$ 709 is coupled to dispersion element D$_4$ 713. The outputs of all four dispersion elements are coupled to λ/4 waveplate and mirror 707.

EXAMPLE

Let the dispersion slope compensator FSR=200 GHz so that $-0.8 \leq \Delta\lambda \leq 0.8$ nm near 1550 nm. For channels spaced on a 100 GHz grid, a multi-band filter (MBF$_1$ in FIG. 7) is used to separate the even and odd channels into separate outputs, with each having a separate dispersion slope compensator (DSC), labeled even and odd for the corresponding set of channels. For a compensation range of +/−400 ps/nm, s=500 ps/nm². The desired delay curve is quadratic with a peak delay of +200 ps at the extreme wavelengths relative to the center of the FSR. The dispersion slope compensator divides the 200 GHz band into four 50 GHz subbands, as indicated by MBF$_2$ and MBF$_3$ in FIG. 7. The desired dispersion for each subband is realized with allpass filters indicated by the D$_n$ boxes in FIG. 7.

The filter's cubic dispersion is $dD_f/d\lambda=s$. For high bitrates and large compensation ranges, it may be necessary to compensate the cubic dispersion to avoid introducing a power penalty. This compensation is easily accomplished with a low-order allpass filter block, labeled S in FIG. 7, which has a FSR equal to the channel spacing before de-interleaving, so 100 GHz in this example. The delay of S, $$\tau_S(\Delta\lambda) = \tau_0 - \frac{s}{2}(\Delta\lambda)^2,$$

is always centered on the channel and may have an arbitrary offset $\tau_0$. This delay does not cancel the filter delay because of the frequency slip, or walkoff, between the filter FSR and the channel spacing. To verify this, note that the overall delay is $$\tau_f(\Delta\lambda + \delta_\lambda) + \tau_S(\Delta\lambda) = \frac{s\delta_\lambda}{2}(2\Delta\lambda - \delta_\lambda)$$

where $\delta_\lambda$ is the wavelength slip between the DSC filter and S for a given channel. The quadratic dispersion is $d(\tau_f+\tau_s)/d\Delta\lambda=s\delta_\lambda$, so the cubic dispersion is zero, as desired.

Figure 8:
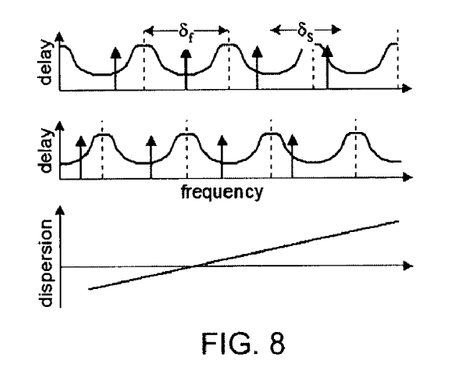
FIG. 8 shows the response of a dispersion slope compensator channel versus filter frequency alignment and resulting dispersion.

The number of channels N$_{ch}$ over which the dispersion slope is compensated depends on the relative difference between the filter FSR ($\delta_f$) and channel spacing ($\delta_s$), where the spacing is now defined in the frequency domain as shown in FIG. 8. The tuning range ($\delta_T$) depends on the signal bandwidth and BWU. Assuming a signal bandwidth equal to twice the bitrate and a BWU=1 for now, the tuning range is $\delta_T=\delta_f-2B$. A typical fiber dispersion slope is in the range of +0.05 to +0.07 ps/nm^2-km. Thus, a compensating response with increasing dispersion as a function of frequency is needed. Choosing $\delta_f > \delta_s$ satisfies this requirement. Let the difference in periods be denoted by $\delta_\Delta=\delta_f-\delta_s$, then the difference is defined by the tuning range and number of channels over which the tuning occurs as follows: $\delta_\Delta=\delta_T/N=(\delta_s-2B)/(N-1)$. For operation on interleaved channels, the total number of channels over which tuning occurs is 2N. For N=33 (17), $\delta_s$=200 GHz and B=40 GHz, $\delta_s$=203.75 (207.0) GHz. Fabrication variations in the filter FSR will change the slip frequency and thus compensation range. Since the filter is tunable, the filter dispersion slope can be adjusted after fabrication to accommodate such variations.

What is claimed:

1. An optical filter to filter light comprising:
a first multiband filter (MBF) to separate the light into N subbands, wherein the optical filter has a free spectral range (FSR) of F, and the first MBF has a FSR of $$F_{fmbf} = \frac{F}{N};$$

a plurality of N branches, each branch comprising a dispersive element, and at least one of the branches having an element selected from the group consisting of a phase control element and a delay element, and each of the branches ending in a branch end;
N additional MBFs having P outputs, each of the N MBFs coupled to respective branch ends, each of the P outputs forming further branches comprising one or more elements selected from the group consisting of a dispersion element, a phase control element and a delay element, and each further branch having a further branch end; and
a mirror oriented to reflect the light from each further branch end back through the respective further end to an output of the first MBF.

2. The optical filter of claim 1 wherein one or more of the elements of the branches comprise allpass filters.

3. The optical filter of claim 2 wherein the allpass filters are fabricated in an integrated structure including planar waveguides.

4. The optical filter of claim 1 wherein one or more of MBFS the comprise a finite impulse response filter (FIR).

5. The optical filter of claim 1 wherein one or more of the MBFS comprise an infinite impulse filter (IIR).

6. A dispersion compensator comprising the optical filter of claim 1.

7. A delay line comprising the optical filter of claim 1.

8. A dispersion slope compensator comprising the optical filter of claim 1.

9. An optical filter to filter light comprising:
an optical circulator to receive the light and to output the filtered light;
a first multi-band filter (MBF1) optically coupled to the output of the circulator, the MBF1 having a first output port and a second output port;
a dispersive element (Da) optically coupled to the MBF1 first output port;
a phase control element (θ), optically coupled to the output of the Da;
a multi-band filter 2a (MBF2a) optically coupled to the output of the phase control element (θ), the MBF2a having an first output port and a second output port;
a delay element (T2a) optically coupled to the MBF2a first output port; the output of T2a optically coupled to a quarter waveplate and a mirror to reflect the light back through T2a;
a phase control element (φ1) optically coupled to the MBF2a second output port; the output of φ1 optically coupled to a quarter waveplate and a mirror to reflect the light back through φ1;
a dispersive element (Db) optically coupled to the MBF1 second output port;
a delay element T1 optically coupled to the output of Db;
a multi-band filter 2b (MBF2b) optically coupled to the output of T1, the MBF2b having an MBF2b first output port and an MBF2b second output port;
a phase control element (φ2) optically coupled to the MBF2b first output port; the output of φ2 optically coupled to a quarter waveplate and a mirror to reflect the light back through φ2;
a delay element (T2b) optically coupled to the MBF2b second output port; the output of T2b optically coupled to a quarter waveplate and a mirror to reflect the light back through T2b.

10. The optical filter of claim 9 wherein one or more of the elements comprise allpass filters.

11. The optical filter of claim 10 wherein the filter is fabricated as an integrated structure including planar waveguides.

12. A method of creating a continuously variable delay of a light signal comprising the steps of:
receiving the light signal at a multiband filter (MBF);
separating the light signal into N subbands with the multiband filter, the subbands containing transition frequencies;
delaying the light of each subband;
matching the phases of the transition frequencies between the subbands using a phase control element; and
reflecting the delayed subband light back through the MBF to an output port.

13. A continuously variable delay line to delay light comprising:
a circulator to receive the light and to output delayed light;
a multi-band filter (MBF) optically coupled to the circulator, and having an MBF first output and an MBF second output;
a first branch comprising a time delay element (T1) and a first branch end coupled to the MBF first output, and a second branch comprising a phase control element (θ) and a time delay element (T2) and having a second branch end coupled to the MBF second output; and
a mirror coupled to the branch ends for receiving the light and reflecting the light back through the branches to the circulator.

14. The delay line of claim 13 wherein one or more of the elements comprise allpass filters.

15. The delay line of claim 13 wherein the delay line is fabricated as an integrated structure including planar waveguides.

16. A dispersion slope compensator to compensate the dispersion slope of light having a plurality of channels comprising:
a circulator to receive the light and to output the dispersion slope compensated light;
an allpass filter optically coupled to the circulator;
a multi-band filter (MBF1) coupled to the allpass filter, the MBF1 having an MBF1 first output and an MBF1 second output; and
an odd dispersion slope compensator (DSCodd) coupled to the MBF1 first output, and an even dispersion slope compensator (DSCeven) coupled to the MBF1 second output, wherein DSCodd acts to compensate the dispersion slope for odd channels and DSCeven acts to compensate the dispersion slope for even channels.

17. The dispersion slope compensator of claim 16 wherein at least one of DSCodd or DSCeven comprises:
a multi-band filter (MBF2) for receiving light to be filtered, MBF2 having a first MBF2 output and a second MBF2 output;
a multi-band filter (MBF3a) coupled to the first output of MBF2, MBF3a having a first MBF3a output and a second MBF3a output;

a dispersive element (D1) coupled to first MBF3a output, and a dispersive element (D2) coupled to second MBF3a output;

a multi-band filter (MBF3b) coupled to the first output of MBF2, MBF3b having a first MBF3b output and a second MBF3b output;

a dispersive element (D3) coupled to first MBF3b output, and a dispersive element (D4) coupled to second MBF3b output; and a mirror coupled to the outputs of the dispersive elements D1, D2, D3, and D4, for reflecting the light back through the dispersive elements to a MBF2 input.

18. The dispersion slope compensator of claim 16 wherein the relative difference between the free spectral range of the filter and the channel spacing determines the number of channels compensated.

19. The dispersion slope compensator of claim 16 wherein the dispersive elements comprise allpass filters.

20. The dispersion slope compensator of claim 16 wherein the filter is fabricated as an integrated structure including planar waveguides.

* * * * *

UNITED STATES PATENT AND TRADEMARK OFFICE
CERTIFICATE OF CORRECTION

PATENT NO. : 7,206,477 B2 Page 1 of 1
APPLICATION NO. : 10/442443
DATED : April 17, 2007
INVENTOR(S) : Christi Kay Madsen It is certified that error appears in the above-identified patent and that said Letters Patent is hereby corrected as shown below:

Col. 7, claim 4, line 32, delete "MBFS the" and insert --the MBFs--.

Col. 7, claim 5, line 34, delete "MBFS" and insert --MBFs--.

Col. 7, claim 9, line 53, delete "an" and insert --a--.

Signed and Sealed this

Tenth Day of July, 2007

JON W. DUDAS
*Director of the United States Patent and Trademark Office*